Sept. 12, 1967 E. A. ZUZELO 3,340,863
MASONRY SAW
Filed Sept. 8, 1964 3 Sheets-Sheet 2

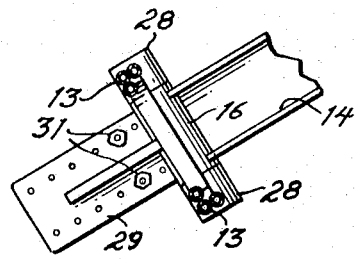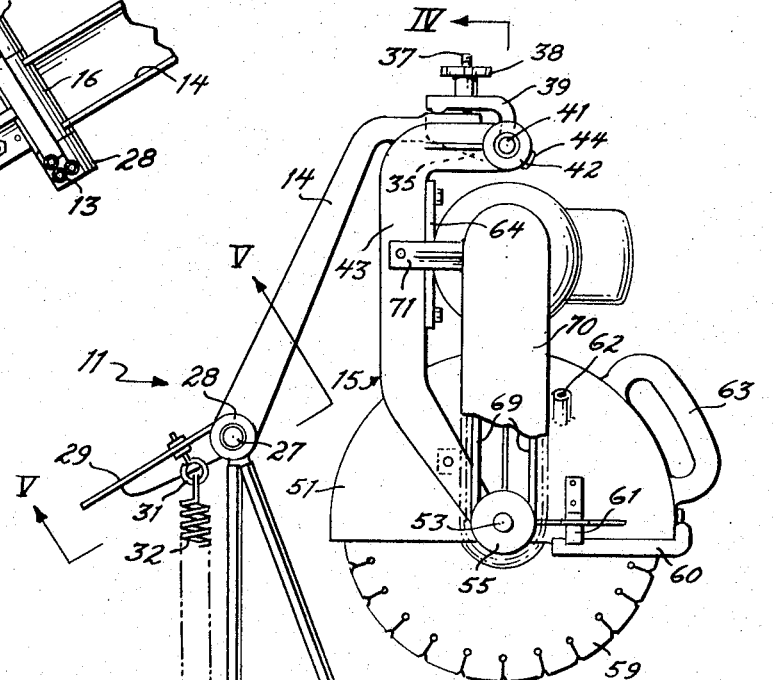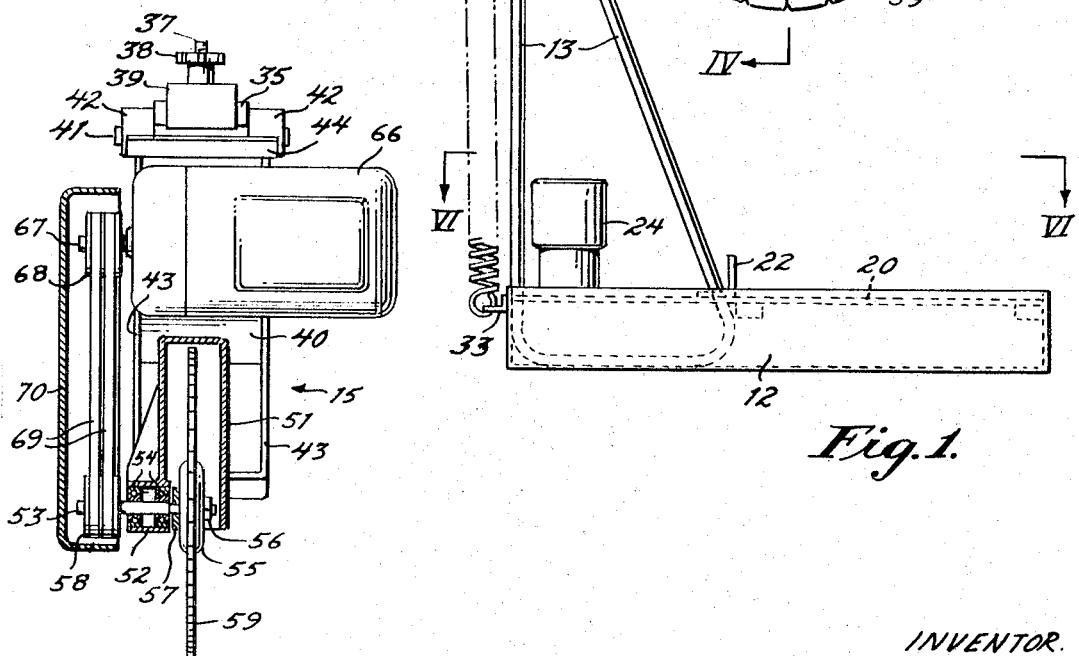

INVENTOR
EDWARD A. ZUZELO
BY McClurg & Weiser
ATTORNEYS.

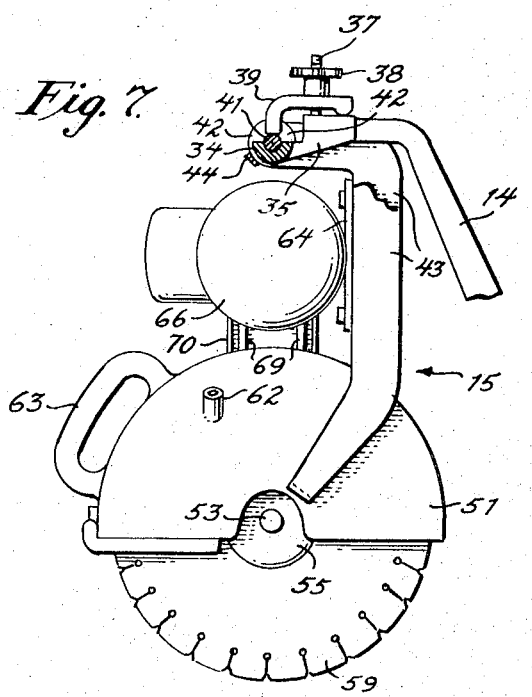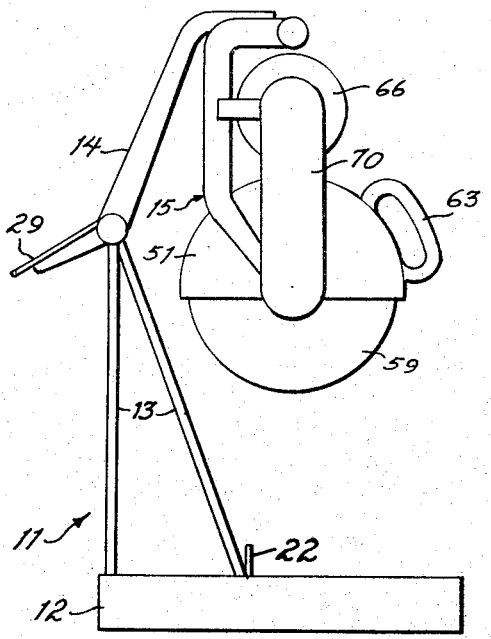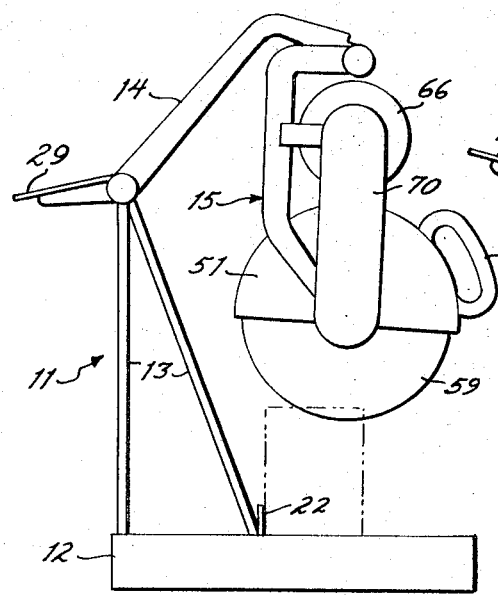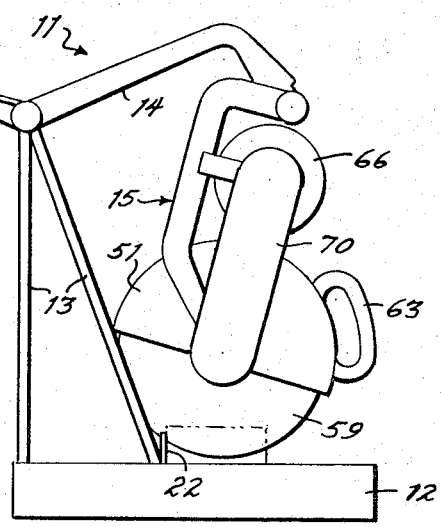

United States Patent Office 3,340,863
Patented Sept. 12, 1967

3,340,863
MASONRY SAW
Edward A. Zuzelo, 652 Broad Acres Road,
Narberth, Pa. 19072
Filed Sept. 8, 1964, Ser. No. 394,672
6 Claims. (Cl. 125—14)

This invention relates to rotary saws for masonry or the like, especially portable table-top masonry saws.

Saws for brick, tile, concrete, or the like are usually unwieldy and far from what might be termed portable. A need exists for a portable masonry saw that can be used on the top of a table, bench, or similar waist-high supporting means without sacrificing safety, dependability, or cutting accuracy.

A primary object of the present invention is provision of a portable masonry saw meeting those requisites.

Another object is provision of such a saw that can be conveniently assembled and disassembled to facilitate moving from one location to another.

A further object is provision of a table-top masonry saw readily adjustable in height, length and depth of cut, and force required to move the saw blade relative to the work to be sawed or cut.

Other objects of the present invention, together with means and methods for attaining the various objects will be apparent from the following description and the accompanying diagrams of a preferred embodiment thereof.

FIG. 1 is a side elevation of apparatus constructed according to the present invention;

FIG. 4 is a partial vertical section taken at IV—IV on FIG. 1;

FIG. 5 is an oblique section taken at V—V on FIG. 1; and

FIG. 7 is a fragmentary side elevation, partly broken away, of the opposite side from that shown in FIG. 1;

FIG. 8 is a diagrammatic side elevation of the apparatus of the preceding views, with the saw carriage shown in high rest position;

FIG. 9 is a diagrammatic side elevation of the same apparatus in an intermediate working position; and FIG. 10 is a diagrammatic side elevation thereof in a low working position.

In general, the objects of the present invention are accomplished, in a rotary saw for masonry or the like, by means of a base, a support upstanding therefrom, an arm pivotally mounted on the support, a depending saw carriage pivotally suspended from the arm, and means for biasing the arm to raise the carriage. A specific embodiment is illustrated and described in some detail.

Figures 2, 3:
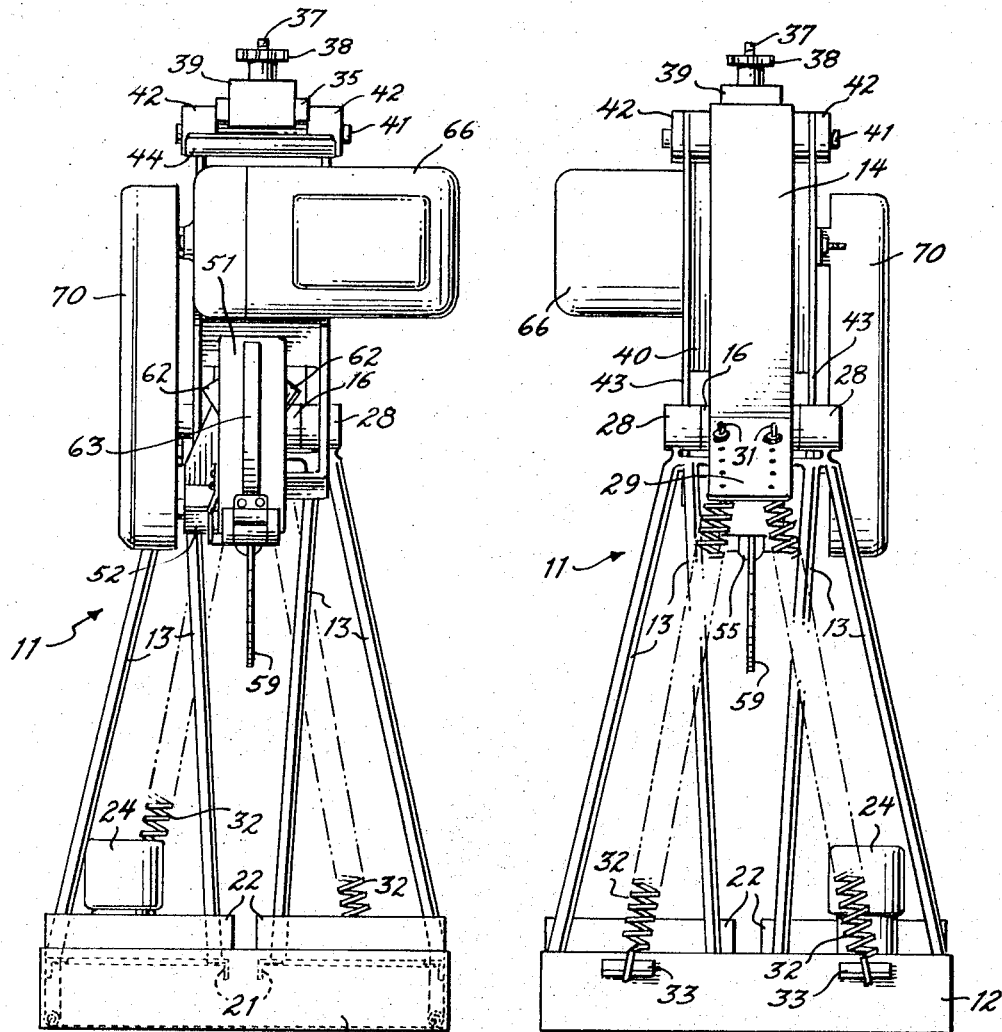
FIG. 2 is a front elevation of the apparatus of the preceding view.
FIG. 3 is a rear elevation of the same apparatus.
Figure 6:
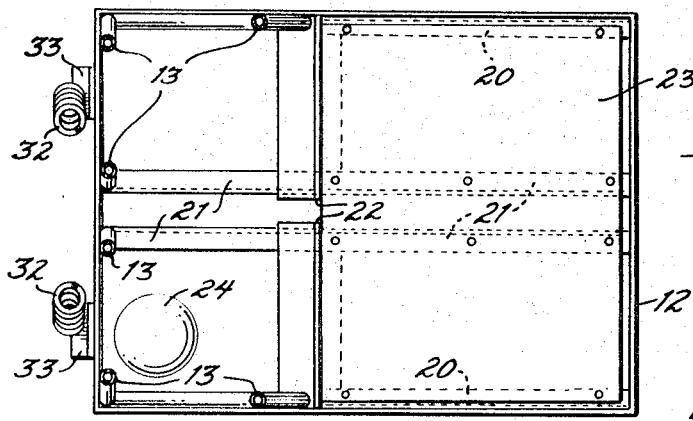
FIG. 6 is a sectional plan taken at VI—VI on FIG. 1.

FIG. 1 shows, in left side elevation, and FIGS. 2 and 3 in front and rear elevation, respectively, saw apparatus 11 having, as principal visible components, base pan 12, pair of upstanding supports or uprights 13 laterally spaced from one another with their foot portions resting in the uncovered rear portion of the base pan, arm 14 pivoted on the uprights, and depending saw carriage 15 suspended pivotally from the remote end of the arm.

Each upright has three legs and presents a generally inverted V configuration when viewed in either side or rear elevation, one leg rising from a rear corner of the base pan, another from near the midpoint of the rear edge, and the third from a location along the side edge somewhat nearer the rear than the front corner. The two side legs of each upright are connected at their feet, the inter-connecting portion extending along the inside bottom surface of the base pan, while the other leg of each rests on ledge 21, of which there are two spaced laterally apart extending from the rear edge to the front edge of the base pan. For secure attachment of the uprights to the pan, one or more of the legs preferably should be welded at the foot thereof to the pan itself or, as in the case of the last mentioned leg, to such a ledge, which itself is secured similarly to the pan. Similar ledges 20 extend along the inside edges of the pan from the front edge to the rear edge also.

Extending transversely of the pan just forward of the third mentioned legs of the uprights and secured on top of ledges 20 and 21 is backstop 22 having an L-shaped cross-section; the backstop is divided midway of its length, leaving a gap midway of the pan. The spacing of pair of ledges 21 and the division of the backstop leave the longitudinal bisector of the base pan free of all impediments except for relatively less durable work-supporting surface 23, which covers essentially the entire portion of the pan bounded by the backstop and the front edge of the pan and the intervening portions of the side edges of the pan, being a major portion of the pan surface. The uncovered minor portion of the pan surface, which accommodates the uprights, also has pump 24 located off-center therein; the lines for transporting lubricant (usually water) from the pump to the saw blade are omitted from illustration of the apparatus in the interest of clarity, as are all electrical leads. It will be understood that the pan is adapted to act as a reservoir of such liquid and to receive it as it washes down from the apparatus.

Arm 14 terminates at one end in sleeve 16, which is pivotally mounted on pivot pin 27 carried in journals 28 at the upper end of uprights 13. Extension 29 at the opposite side of the fulcrum provided by the pivot pin is affixed to the arm and is provided with pairs of openings to receive bolts or similar securing means. Shown are pair of eye-bolts 31 in a pair of such holes in the extension, each eye-bolt having hooked through it one end of extension spring 32, the other ends of the pair of springs being affixed to flange 33 (of which there are a pair) on the back of base pan 12. Arm 14 is channel-shaped and straight for most of its length but curves at its opposite or upper end toward the horizontal and terminates in journal half (open upward) attached to the arm proper by means of stepped terminus piece 35 (see FIG. 7 for details). Protruding upward from the terminus piece is threaded stud 37 on which is nut 38 to retain L-shaped clamp 39 in place. As one end of the clamp is forced against the upper face of the terminus piece the other end of the clamp retains pivot pin 41 of saw carriage 15 pivotally in place in journal half 34 of arm 14.

Saw carriage 15 has side walls 43 bridged by cross-piece 40 and, thus, is also generally channel-shaped in transverse cross-section; it is a modified C-shape in side elevation. At the top end of the carriage, pivot pin 41, which rests injournal half 34 of arm 14 as just described, engages at its opposite ends collars 42 affixed to side walls 43 of the carriage and to reinforcing piece 44 which bridges the collars in a direction parallel to the pivot pin. The bottom end of the carriage has tool guard 51 affixed thereto and carrying at one side thereof bearing housing 52 in which are bearings 54 for the tool shaft 53. At one end of the tool shaft is hub 55 retained by nut 56 and spaced from the bearing housing by washer 57. The tool shaft has pulley 58 affixed to the opposite end thereof. Disc-like rotary tool 59, which has its peripheral surface separated into segments with indentations therebetween, is secured to the shaft by hub 55. The tool shown is a usual masonry sawblade.

Tool guard 51 has the configuration of substantially half of a relatively flat cylinder cut diametrically; it is concentric with the rotary tool, the common axis being horizontal, and covers the upper half or so thereof. Pivotally supported at the front edge of the tool guard is bifurcated protective shield 60, which normally is retained against the front half of the diametrical edge of the guard by spring clip 61 thereon. When a rotary tool is being inserted or removed the protective shield may be unclipped and swung downward to expose the entire under side of the guard. On either side of the guard near the top edge is nipple 62 to accommodate lubricant lines (not shown) from the pump. At the forward edge of the guard is grip 63 by which the location of the rotary tool may be controlled as desired. Affixed to the side walls of the carriage by secondary cross-piece 64 retained against the edges of the side walls by bolts through both crosspieces is motor 66. Motor shaft 67 has pulley 68 affixed thereto in line with pulley 58; pair of belts 69, which are covered by belt guard 70 having bracket 71 retaining it against one of the side walls of the carriage, interconnect the two pulleys.

Operation of this apparatus is readily understood, especially by reference to FIGS. 8, 9, and 10, all of which show the apparatus, rather diagrammatically, in side elevation. In FIG. 8 the saw carriage is hanging freely from the pivot at the end of arm 14, which is biased to its highest location, corresponding to a non-use or rest position of the saw blade or other rotary tool. FIG. 9 shows a somewhat lower position in which the tool is engaging the upper front portion of an object (shown in phantom) to be cut, such as a concrete or cinder block, for example. This working position of the tool is brought about mainly by means of the grip at the front of the tool guard. The saw carriage not only may be lowered by a downward force applied to the grip, but the tool may be swung about the pivot from which it depends so as to move the saw blade to and fro above the work-supporting surface. FIG. 10 shows a lower working position, such as would be employed in sawing a brick or the like. These and intermediate positions may be attained with relative ease by an operator standing at the front of the bench or table upon which the entire apparatus rests and applying suitable force downwardly, as well as forwardly and rearwardly, to the tool guard grip. The operation of this apparatus is simplicity itself, and the simple and rugged construction leads to precise and dependable operation with relatively little need for maintenance or repair.

The apparatus of this invention requires no special materials. Although a preferred embodiment has been described and illustrated, modifications may be made therein, as by adding or subdividing parts or by altering their size, shape, or location, or by substitution of equivalents, while retaining all or some of the benefits and advantages and without involving a departure from the inventive concept embodied therein and defined by the following claims.

I claim:
1. A portable saw for masonry or the like, comprising a base, a support upstanding therefrom, an arm pivotally mounted on the support for movement in a vertical plane and having carriage-suspending means at one end, means biasing said arm to an upper position, a generally C-shaped saw carriage freely pivotally suspended on the suspending means and depending therefrom, a rotary saw blade mounted at the lower end of the saw carriage and having a rest position directly under the locus of suspension, and blade-rotating motive means carried in the concave position of the saw carriage intermediate the locus of suspension and the saw blade so that a straight line drawn between the locus of suspension and the center of the saw blade intersects the approximate center of said motive means in all positions of said carriage.

2. A portable saw according to claim 1 wherein the carriage-suspending means includes a generally upward facing bearing surface, and the saw carriage has complementary means at its upper end to rest thereon under the influence of gravity.

3. A portable saw according to claim 2 including quick-release clamping means for securing the saw carriage to the suspending arm.

4. A portable saw according to claim 1 wherein the base comprises a pan at least partially covered by a work surface under the carriage location.

5. A portable saw according to claim 4 wherein the support includes a pair of generally triangular uprights fitting within the pan and retained removably therein adjacent the bottom, one end, and the partial cover.

6. A table-top masonry saw, comprising a base including a pan for lubricant, a work-supporting surface covering a major part of the pan, the uncovered part of the pan receiving the feet of upstanding supports; a plurality of uprights having feet fitting into the uncovered part of the base pan, the supports being spaced laterally of one another; an arm pivoted at the upper end of the supports for movement in a vertical plane, an extension on the arm, the pivot for the arm being located between the extension and the arm proper, a pair of extension springs laterally spaced from one another detachably interconnecting the extension to the base pan; a depending saw carriage suspended pivotably and detachably from the arm end remote from the pivot thereof on the upstanding supports, including a generally C-shaped frame with a rotary saw blade mounted at one end for rotation in a vertical plane, a guard surrounding the upper portion of the saw blade, a grip affixed to the guard and extending over the work-supporting surface, a motor carried on the intermediate portion of the frame and interconnected to rotate the saw blade, the upper end of the frame resting pivotally on the end of the arm; and a clamp including a bolt in the arm, a wing nut on the bolt, and a clamp piece retained on the bolt by the wing nut and overlying the upper end of the frame resting on the arm end and securing it pivotally in place thereon upon tightening of the clamp.

References Cited

UNITED STATES PATENTS

| | | | |
|---|---|---|---|
| Re. 25,077 | 11/1961 | Zuzelo | 125—13 |
| 512,740 | 1/1894 | Ogle et al. | 51—99 X |
| 1,095,399 | 5/1914 | Huntington. | |
| 1,385,731 | 7/1921 | Taylor | 125—30 X |
| 2,535,182 | 12/1950 | Weaver | 143—46 X |
| 2,726,632 | 12/1955 | Brittain | 125—13 |
| 2,729,249 | 1/1956 | Keipp | 125—13 X |
| 3,016,656 | 1/1962 | Smith | 51—166 X |
| 3,027,886 | 4/1962 | Zuzelo | 125—13 |

FOREIGN PATENTS 481,176   1938   Great Britain.

HAROLD D. WHITEHEAD, *Primary Examiner.*